United States Patent
Doornenbal

(10) Patent No.: US 9,355,084 B2
(45) Date of Patent: May 31, 2016

(54) SYSTEMS, COMPUTER-PROGRAM PRODUCTS AND METHODS FOR ANNOTATING DOCUMENTS BY EXPANDING ABBREVIATED TEXT

(71) Applicant: Elsevier B.V., Amsterdam (NL)

(72) Inventor: Marius Doornenbal, Meteren (NL)

(73) Assignee: Elsevier B.V., Amsterdam (NL)

( * ) Notice: Subject to any disclaimer, the term of this patent is extended or adjusted under 35 U.S.C. 154(b) by 224 days.

(21) Appl. No.: 14/080,130

(22) Filed: Nov. 14, 2013

(65) Prior Publication Data

US 2015/0135063 A1   May 14, 2015

(51) Int. Cl.
| | |
|---|---|
| *G06F 17/00* | (2006.01) |
| *G06F 17/24* | (2006.01) |
| *G06F 17/27* | (2006.01) |
| *G06F 12/04* | (2006.01) |
| *G06F 12/08* | (2016.01) |

(52) U.S. Cl.
CPC ............ *G06F 17/241* (2013.01); *G06F 17/277* (2013.01); *G06F 12/04* (2013.01); *G06F 12/0886* (2013.01); *G06F 17/24* (2013.01); *G06F 17/276* (2013.01); *G06F 17/2765* (2013.01); *G06F 17/2785* (2013.01); *G06F 17/2795* (2013.01)

(58) Field of Classification Search
CPC ..... G06F 17/241; G06F 17/24; G06F 17/276; G06F 17/2765; G06F 17/2785; G06F 17/2795; G06F 12/04; G06F 12/0886
USPC ................. 715/257–261; 704/243–276, 4–10
See application file for complete search history.

(56) References Cited

U.S. PATENT DOCUMENTS

| | | | |
|---|---|---|---|
| 7,003,725 B2 | 2/2006 | Castellanos et al. | |
| 7,028,038 B1 * | 4/2006 | Pakhomov ............ | G06F 17/277 704/275 |
| 7,136,876 B1 | 11/2006 | Adar et al. | |
| 7,475,343 B1 | 1/2009 | Mielenhausen | |
| 8,122,022 B1 | 2/2012 | Baker | |
| 8,204,874 B2 | 6/2012 | Wei et al. | |
| 2002/0077816 A1 * | 6/2002 | Shen ..................... | G10L 15/063 704/254 |
| 2003/0139921 A1 * | 7/2003 | Byrd .................... | G06F 17/2775 704/10 |
| 2004/0205668 A1 * | 10/2004 | Eastlake, III ....... | G06F 17/2247 715/234 |
| 2007/0220037 A1 | 9/2007 | Srivastava et al. | |
| 2009/0259629 A1 | 10/2009 | Wei et al. | |
| 2013/0191738 A1 | 7/2013 | Bank et al. | |

OTHER PUBLICATIONS

"Phrasal Analysis of Long Noun Sequences" by Arens et al. Published 1987 p. 59-64.*

* cited by examiner

*Primary Examiner* — Quoc A Tran
(74) *Attorney, Agent, or Firm* — Dinsmore & Shohl LLP

(57) ABSTRACT

Systems, computer-program products and methods for annotating electronic text documents by resolving abbreviated text of concepts defined in a controlled vocabulary. In one embodiment, a method of annotating an electronic text document includes evaluating, by a computer, the electronic text document for one or more multi-word expressions having a first word and a second word. The method further includes, if a multi-word expression is found in the electronic text document, storing an abbreviation of the multi-word expression and evaluating the electronic text document for occurrences of the abbreviation after a location of the multi-word expression. The method further includes, if an occurrence of the abbreviation is found following the multi-word expression, annotating the occurrence of the abbreviation with the multi-word expression.

20 Claims, 2 Drawing Sheets

SYSTEMS, COMPUTER-PROGRAM PRODUCTS AND METHODS FOR ANNOTATING DOCUMENTS BY EXPANDING ABBREVIATED TEXT

BACKGROUND

1. Field

The present specification generally relates to systems, computer-program products and methods for annotating documents and, more particularly, to systems, computer-program products, and methods for annotating documents by resolving abbreviated text with expanded forms as found in one or more controlled vocabularies.

2. Technical Background

Electronic text documents may be annotated with information. Annotations may be provided in metadata, for example. Markup languages, such as XML, may be utilized to provide additional information regarding an electronic text document beyond the original text. In some cases, an electronic text document is annotated with information regarding the subject matter discussed within the electronic text document.

In text documents, such as scientific text documents, there is a strong tendency to economize on words and space by use of abbreviation. For example, a common pattern in text documents mentioning species is to abbreviate the family name. For instance, "*bacillus anthracis*" is abbreviated as "*B. anthracis*;" and "*Zaprionus indianus*" is abbreviated as "*Z. indianus.*"

Another pattern, which is semantically distinct but syntactically identical to abbreviating the family name described above, is the abbreviation of names of people. For example, the name "Stuart Hall" may be abbreviated as "S. Hall."

Expansion of abbreviation term patterns not only enhances recall of entities defined in a controlled vocabulary (e.g. a thesaurus), but also improves precision in automatically identifying concepts described within the text document. For example, "*D. melanogaster*" might be incorrectly identified as "melanogaster" during automatic text analysis, which is unrelated to *Drosophila*.

Accordingly, a need exists for alternative methods of annotating electronic text documents that expand abbreviations into their full multi-word form.

SUMMARY

According to one embodiment, a method of annotating an electronic text document includes evaluating, by a computer, the electronic text document for one or more multi-word expressions having a first word and a second word. The method further includes, if a multi-word expression is found in the electronic text document, storing an abbreviation of the multi-word expression and evaluating the electronic text for occurrences of the abbreviation after a location of the multi-word expression. The method further includes, if an occurrence of the abbreviation is found following the multi-word expression, annotating the occurrence of the abbreviation with the multi-word expression.

According to another embodiment, a computer program product includes a computer-readable medium storing executable instructions that, when executed by a computing device, causes the computing device to evaluate an electronic text document for one or more multi-word expressions having a first word and a second word. The executable instructions further cause the computing to, if a multi-word expression is found in the electronic text document, store an abbreviation of the multi-word expression and evaluate the electronic text document for occurrences of the abbreviation after a location of the multi-word expression. The executable instructions further cause the computing device to, if an occurrence of the abbreviation is found following the multi-word expression, annotate the occurrence of the abbreviation with the multi-word expression.

According to yet another embodiment, a system for annotating documents includes a processor and a computer-readable medium. The computer-readable medium stores executable instructions that, when executed by the processor, causes the processor to evaluate an electronic text document for one or more multi-word expressions having a first word and a second word. The executable instructions further cause the processor to, if a multi-word expression is found in the electronic text document, store an abbreviation of the multi-word expression and evaluate the electronic text document for occurrences of the abbreviation after a location of the multi-word expression. The executable instructions further cause the processor to, if an occurrence of the abbreviation is found following the multi-word expression, annotate the occurrence of the abbreviation with the multi-word expression.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems, computer-program products, and methods for resolving abbreviated text occurrences of concepts described in a controlled vocabulary to their expanded, full terms. As such, embodiments of the present disclosure annotate occurrences of abbreviated text with their full multi-word expressions, thereby improving the recognition of entities defined in the controlled vocabulary.

More specifically, embodiments evaluate the text of an electronic text document for multi-word expressions that are present within a controlled vocabulary, such as a thesaurus. If a multi-word expression is found, it is stored in a data structure along with an abbreviation that comprises the first letter of the first word of the multi-word expression and the full second word of the multi-word expression. As an example and not a limitation, an abbreviation of the multi-word expression "*bacillus anthracis*" may be stored in the data structure as "*B. anthracis*." Similarly, an annotation of "*Zaprionus indianus*" may be stored as "*Z. indianus*" in the data structure. It is noted that punctuation and capitalization of the abbreviation are not stored in the data structure such that abbreviations such as "z indianus" appearing within the text may also be found and annotated accordingly. The text of the electronic text document may then be evaluated for occurrences of one or more abbreviations stored in the data structure. If an abbreviation is found, the occurrence is annotated with the full multi-word expression. The annotation may be stored in the data structure (i.e., the data structure storing the found multi-word expression and abbreviation), in the electronic text document itself, or in another data structure or electronic file.

The systems, computer-program products and methods described herein may be utilized to expand abbreviations that occur in any type of text document, including, but not limited to, patent documents, legal documents, agricultural documents, scientific research documents, news articles, and journals. The phrase "controlled vocabulary" means any data structure wherein terms and phrases are organized. Example controlled vocabularies include, but are not limited to, thesauri, taxonomies, and subject indexes. "Annotation" means any information regarding an electronic text document beyond the text of the electronic text document. Annotations may be provided in any type of output, including, but not limited to, marked-up electronic text documents or data structures separate from the electronic text documents.

Various systems, computer-program products and methods for annotating electronic text documents by expanding abbreviations are described in detail below.

Figure 1:
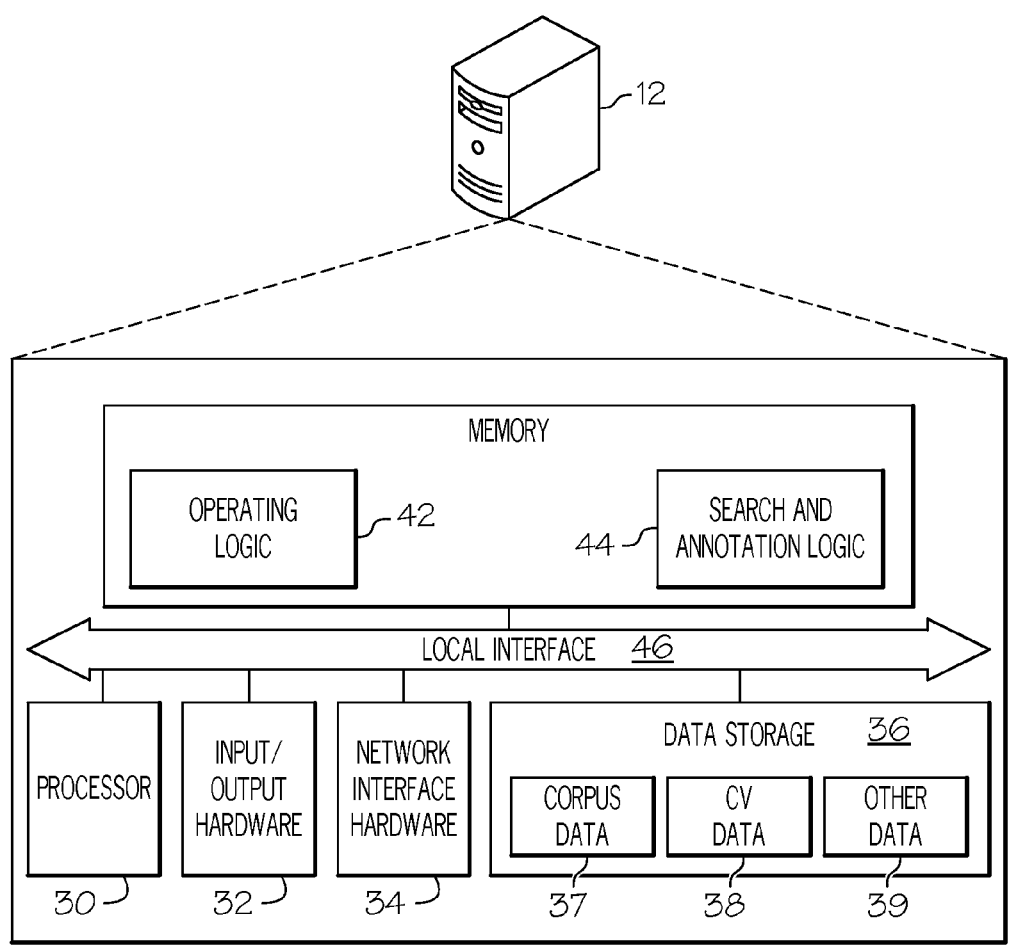
FIG. 1 depicts a schematic illustration of a computing device illustrating hardware and software that may be utilized to annotate an electronic text document by automatically resolving abbreviated text occurrences within the electronic text document with their expanded, full terms.

FIG. 1 depicts a computing device 12 illustrating a computer-implemented system for expanding abbreviations to their expanded, full form, and/or a non-transitory computer-readable medium for expanding abbreviations to their full form, software, and/or firmware, according to embodiments shown and described herein. While in some embodiments, the computing device 12 may be configured as a general purpose computer with the requisite hardware, software, and/or firmware, in some embodiments, the computing device 12 may be configured as a special purpose computer designed specifically for performing the functionality described herein. The computing device 12 may be configured as any computing device, such as, but not limited to, a server, a desktop computer, a laptop computer, a tablet computer, and a smart phone. Although FIG. 1 depicts an embodiment wherein the computer-implemented method is performed by a single computing device, embodiments are not limited thereto. For example, embodiments may be configured as networked computing devices, such that any number of computing devices may be communicatively coupled to perform the methods described herein in a distributed computing manner.

As also illustrated in FIG. 1, the computing device 12 may include a processor 30, input/output hardware 32, network interface hardware 34, a data storage component 36 (which may store corpus data 37, controlled vocabulary data 38, and other data 39), and a non-transitory memory component 40. The memory component 40 may be configured as volatile and/or nonvolatile computer-readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42 and search and annotation logic 44 (each of which may be embodied as a computer-program, firmware, or hardware, as an example). A local interface 46 is also illustrated in FIG. 1 and may be implemented as a bus or other interface to facilitate communication among the components of the computing device 12.

The processor 30 may include any processing component(s) configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the computing device 12, and may be configured to store one or more pieces of data for access by the computing device 12 and/or other components. As illustrated in FIG. 1, the data storage component 36 may store corpus data 37, which includes electronic text documents. The electronic text documents may include, but are not limited to, scientific journals, agricultural documents, news articles, and patent documents. The corpus data 37 may be stored in one or more data storage devices either internal or external to the computing device. In some embodiments, the electronic text documents may be configured as marked-up electronic documents that have been annotated by a mark-up language, such as XML, for example.

The controlled vocabulary data 38 includes data associated with one or more controlled vocabularies. One or more controlled vocabularies may be utilized for each topical document corpus. For example, a first controlled vocabulary may be used for a first topical document corpus containing documents relevant to the topic of physics. Any controlled vocabulary may be utilized depending on the topic of the documents stored in the document corpus. Exemplary controlled vocabularies may include, but are not limited to, Compendex, Medical Subject Headings ("MeSH"), National Agricultural Library agricultural thesaurus ("NAL"), as well as custom thesauri or indices.

Similarly, the controlled vocabulary data 38 may be stored by the data storage component 36 local to the computing device or stored remotely from the computing device 12 (e.g., an external storage device, a networked computer, or a remote server). Other data 39 may be stored in the data storage component 36 to provide storage for data structures containing the annotations described herein, as well as support for functionalities described herein (e.g., metadata that may be utilized in conjunction with the corpus data and/or the controlled vocabulary data 38).

Included in the memory component 40 are the operating logic 42 and the search and annotation logic 44. The operating logic 42 may include an operating system and/or other software for managing components of the computing device 12. The search and annotation logic 44 may be configured as computer-readable instructions that provide for the search of both the electronic text documents and controlled vocabularies to resolve abbreviated text within electronic text documents, as well as to annotate the electronic text documents accordingly, as described in the computer-implemented methods below.

It should be understood that the components illustrated in FIG. 1 are merely exemplary and are not intended to limit the scope of this disclosure. More specifically, while the components in FIG. 1 are illustrated as residing within the computing device 12, this is a nonlimiting example. In some embodiments, one or more of the components may reside external to the computing device 12. Similarly, while FIG. 1 is directed to the computing device 12, other components may include similar hardware, software, and/or firmware. The processor 30, memory component 40 and search and annotation logic 44 may define a computer-program product for annotating electronic documents by resolving abbreviations of concepts defined in a controlled vocabulary to their expanded, full forms.

As stated above, embodiments of the present disclosure find abbreviations of well-ordered, multi-word expressions within the text of electronic text documents and annotate the occurrences of the abbreviations with their expanded form. Commonly, a multi-word expression appears first in full form, and then is later abbreviated within the text of the electronic text document. As indicated in the examples above, the multi-word expressions "*bacillus anthracis*" and "*Zaprionus indianus*" may be well-ordered multi-word expressions that appear within one or more controlled vocabularies. These expressions may be abbreviated as "*B. anthracis*" and "*Z. indianus*," respectively, after their full form appears within the text of the electronic text document. Each well-ordered, multi-word expression within the controlled vocabulary(s) has an associated meaning as defined by the controlled vocabulary.

Figure 2:
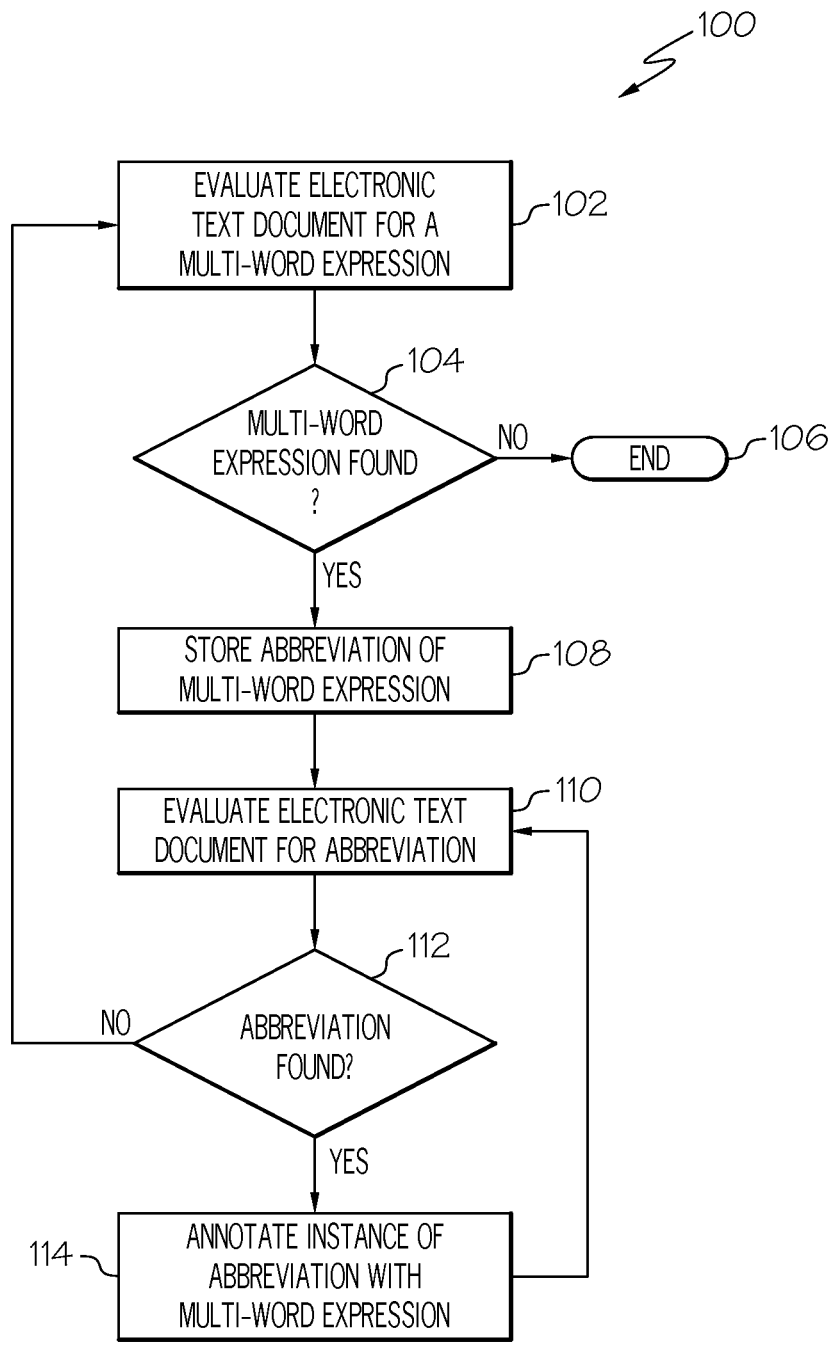
FIG. 2 depicts a flowchart graphically illustrating a computer-implemented method of annotating an electronic text document by automatically resolving abbreviated text occurrences within the electronic text document with their expanded, full terms.

Referring now to FIG. 2, a flowchart 100 showing an example computer-implemented method of annotating an electronic text document with full expanded forms of abbreviations of multi-word expressions found within a controlled vocabulary is illustrated. It should be understood that the flowchart 100 of FIG. 2 is for illustrative purposes only, and embodiments are not limited to the steps and process flow depicted in FIG. 2. The process may start at block 102, where the text of an electronic text document is evaluated for the occurrence of a multi-word expression that is found in one or more controlled vocabularies. In some embodiments, the text is scanned, such as from the beginning of the electronic text document to the end of the electronic text document in a reading direction. The multi-word expressions are well-ordered expressions that appear within the one or more controlled vocabularies. In some embodiments, all (or a select sub-set) of multi-word expressions are extracted from the controlled vocabulary (or vocabularies) and stored in a data structure that may be used to search for the multi-word expressions within the electronic text document.

If no multi-word expression is found at block 104, the process ends at block 106. If a multi-word expression is found within the text of the electronic text document at block 104, then the process moves to block 108. At block 108, an abbreviation of the found multi-word expression is generated and stored. The abbreviation may be the first letter of the first word of the multi-word expression, and the second word of the multi-word expression. In some embodiments, the full multi-word expression is also stored in association with the abbreviation. In some embodiments, the abbreviation (and, in some embodiments, the multi-word expression) is stored in a data structure, such as a table or database, that is separate from the electronic text document. In other embodiments, the abbreviation (and, in some embodiments, the multi-word expression) is stored in metadata associated with the electronic text document, such as by XML, for example.

By storing the abbreviation and the multi-word expression in the data structure, the abbreviation may be retrieved when searching the electronic text document for the abbreviation. At block 110, the text of the electronic text document is evaluated to determine if the abbreviation of the found multi-word expression is present within the text of the electronic text document following a location of multi-word expression in the reading direction. In some embodiments, the text of the electronic text document is scanned in the reading direction, such as from the location of the occurrence of the found multi-word expression toward the end of the electronic text document. In some embodiments, the occurrence of the multi-word expression (block 102) and the occurrence of an abbreviation of the multi-word express (block 110) are evaluated in the same text scan. In other embodiments, they are performed in separate text scans.

If no abbreviation is found at block 112, then the process may return to block 102 to evaluate the text for another multi-word expression that is stored within one or more controlled vocabularies. If an abbreviation of the multi-word expression is found within the text during the scan, then the occurrence of the abbreviation is annotated with the expanded, full form of the multi-word expression. As an example and not a limitation, the abbreviation "*B. anthracis*" may be annotated with the multi-word expression "*bacillus anthracis*." The output containing the annotation information may take many forms. In some embodiments, the annotation is stored in a data structure separate from the electronic text document. In other embodiments, the annotation is stored in metadata associated with the electronic text document.

The process may then move once again to block 110 where the text of the electronic text document is evaluated for additional occurrences of abbreviations. Blocks 110, 112 and 114 may be repeated until no more abbreviations of the particular multi-word expression are found. If no abbreviation of the multi-word expression is found at block 112, the process goes back to block 102, wherein the text is evaluated for another multi-word expression that is provided in the one or more controlled vocabularies. Accordingly, embodiments evaluate the text of electronic documents for occurrences of multi-word expressions found in one or more controlled vocabularies, and then annotate occurrences of abbreviations of those multi-word expressions found within the text of the electronic text document with the full form of the multi-word expressions.

It is noted that, although the flowchart 100 of FIG. 2 depicts a process wherein a multi-word expression is found, abbreviations of that multi-word expression are determined, and then another multi-word expression is found, embodiments are not limited thereto. For example, detection of occurrences of multi-word expressions and occurrences of abbreviations of found multi-word expressions may be performed simultaneously. In such embodiments, each word may be sequentially analyzed as the text is linearly scanned to determine if the word is either a multi-word expression found in the controlled vocabulary or an abbreviation of a previously-found multi-word expression. In still other embodiments, the text of the electronic text document may be linearly scanned for multi-word expressions in a first scan, and then abbreviations for those multi-word expressions that were found may be determined in a second scan. The occurrences of abbreviations may be annotated during (or after) the second scan as described above.

In some embodiments, competing terms may also be determined, and occurrences of abbreviations corresponding to competing terms may be annotated with the competing term. A competing term is a multi-word phrase that: 1) appears within the controlled vocabulary; 2) has the same first letter of the first word as a multi-word expression in the controlled vocabulary that was previously found in the text of the electronic text document; and 3) has the same second word as the previously found multi-word expression. Embodiments of the present disclosure may annotate occurrences of abbreviations with a full form of the multi-word expression until a competing term is found. Occurrences of abbreviations following the competing term may be annotated with the competing term rather than the original multi-word expression.

As an example and not a limitation, the name "Stuart Hall" may occur both within a controlled vocabulary and the text of an electronic text document. Further, the abbreviation "S. Hall" may appear within the text of the electronic text document following the occurrence of the full name "Stuart Hall." However, the name "Samuel Hall" may also occur both within the controlled vocabulary and the text of the electronic text document. The name "Samuel Hall" is a competing term to the name "Stuart Hall." Further, occurrences of the abbreviation "S. Hall" may also occur within the text of the electronic text document following the competing term "Samuel Hall." Embodiments described herein may annotate the occurrences of abbreviation "S. Hall" following the first multi-word expression ("Stuart Hall") and the competing term ("Samuel Hall") with the multi-word expression "Stuart Hall." However, occurrences of "S. Hall" following the competing term "Samuel Hall" may be annotated with the competing term "Samuel Hall." Any number of competing terms may be found within the text of the electronic text document.

It should be understood that embodiments described herein provide for automatic expansion of abbreviations to their expanded, full forms as provided in one or more controlled vocabularies. Occurrences of abbreviations may be annotated with the multi-word expression stored in the one or more controlled vocabularies. Annotations may be stored in a data structure separate from the electronic documents, or within the electronic documents themselves as metadata. Further, occurrences of abbreviations may be annotated with competing terms if a competing term appears within the text of an electronic text document after a multi-word expression.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of annotating an electronic text document, the method comprising:
   evaluating, by a computer, the electronic text document for one or more multi-word expressions comprising a first word and a second word;
   when a multi-word expression is found in the electronic text document, storing an abbreviation of the multi-word expression;
   evaluating the electronic text document for occurrences of the abbreviation after a location of the multi-word expression;
   when a competing term is found with respect to the abbreviation, annotating occurrences of the abbreviation following the competing term with the competing term; and
   when an occurrence of the abbreviation is found following the multi-word expression, annotating the occurrence of the abbreviation with the multi-word expression,
   wherein:
      the abbreviation comprises a first letter of the first word of the multi-word expression or the competing term, and the second word of the multi-word expression and the competing term, and
      the competing term comprises a first word having a first letter that is the same as the first letter of the first word of the multi-word expression, and a second word that is the same as the second word of the multi-word expression.

2. The method of claim 1, wherein the abbreviation is stored in a data structure that comprises the multi-word expression and the abbreviation.

3. The method of claim 1, wherein one or more annotations of the occurrence of the abbreviation with the multi-word expression are provided in a data structure that is separate from the electronic text document.

4. The method of claim 1, wherein the electronic text document is annotated in XML format.

5. The method of claim 1, further comprising searching a controlled vocabulary for the multi-word expression, wherein the electronic text document is evaluated for occurrences of the abbreviation only when the multi-word expression is found in the controlled vocabulary.

6. The method of claim 5, wherein the electronic text document is classified in a topical document corpus, and the controlled vocabulary is specific to the topical document corpus.

7. The method of claim 1, wherein the-electronic text document comprises at least one of a scientific journal, an agricultural document, a news article, and a patent document.

8. The method of claim 1, wherein the electronic text document is annotated in a mark-up language.

9. The method of claim 1, wherein evaluating the electronic text document for the one or more multi-word expressions comprises scanning the electronic text document from a beginning of the electronic text document to an end of the electronic text document in a reading direction.

10. The method of claim 1, further comprising:
   when a second multi-word expression is found in the electronic text document, storing a second abbreviation of the second multi-word expression;
   evaluating the electronic text document for occurrences of the second abbreviation after a location of the second multi-word expression; and
   when an occurrence of the second abbreviation is found following the second multi-word expression, annotating the occurrence of the second abbreviation with the second multi-word expression.

11. A computer-program product comprising:
   a non-transitory, computer-readable medium storing executable instructions that, when executed by a computing device, causes the computing device to:
      evaluate an electronic text document for one or more multi-word expressions comprising a first word and a second word;
      when a multi-word expression is found in the electronic text document, store an abbreviation of the multi-word expression;
      evaluate the electronic text document for occurrences of the abbreviation after a location of the multi-word expression;
      when a competing term is found with respect to the abbreviation, annotate occurrences of the abbreviation following the competing term with the competing term; and
      when an occurrence of the abbreviation is found following the multi-word expression, annotate the occurrence of the abbreviation with the multi-word expression, wherein:
         the abbreviation comprises a first letter of the first word of the multi-word expression or the competing term, and the second word of the multi-word expression and the competing term, and the competing term comprises a first word having a first letter that is the same as the first letter of the first word of the multi-word expression, and a second word that is the same as the second word of the multi-word expression.

12. The computer-program product of claim 11, wherein the abbreviation is stored in a data structure in the computer-readable medium that comprises the multi-word expression and the abbreviation.

13. The computer-program product of claim 11, wherein the executable instructions further cause the computing device to search a controlled vocabulary for the multi-word expression, wherein the electronic text document is evaluated for occurrences of the abbreviation only when the multi-word expression is found in the controlled vocabulary.

14. The computer-program product of claim 11, wherein the executable instructions that cause the computing device to evaluate the electronic text document for the one or more multi-word expressions comprises executable instructions that cause the computing device to scan the electronic text document from a beginning of the electronic text document to an end of the electronic text document in a reading direction.

15. The computer-program product of claim 11, wherein the executable instructions further cause the computing device to:

when a second multi-word expression is found in the electronic text document, store a second abbreviation of the second multi-word expression;

evaluate the electronic text document for occurrences of the second abbreviation after a location of the second multi-word expression; and when an occurrence of the second abbreviation is found following the second multi-word expression, annotate the occurrence of the second abbreviation with the second multi-word expression.

16. A system for annotating documents, the system comprising:

a processor; and a non-transitory computer-readable medium storing executable instructions that, when executed by the processor, causes the processor to:

evaluate an electronic text document for one or more multi-word expressions comprising a first word and a second word;

when a multi-word expression is found in the electronic text document, store an abbreviation of the multi-word expression;

evaluate the electronic text document for occurrences of the abbreviation after a location of the multi-word expression;

when a competing term is found with respect to the abbreviation, annotate occurrences of the abbreviation following the competing term with the competing term; and when an occurrence of the abbreviation is found following the multi-word expression, annotate the occurrence of the abbreviation with the multi-word expression, wherein:

the abbreviation comprises a first letter of the first word of the multi-word expression or the competing term, and the second word of the multi-word expression and the competing term, and the competing term comprises a first word having a first letter that is the same as the first letter of the first word of the multi-word expression, and a second word that is the same as the second word of the multi-word expression.

17. The system of claim 16, wherein the abbreviation is stored in a data structure in the computer-readable medium that comprises the multi-word expression and the abbreviation.

18. The system of claim 16, wherein the executable instructions further cause the processor to search a controlled vocabulary for the multi-word expression, wherein the electronic text document is evaluated for occurrences of the abbreviation only when the multi-word expression is found in the controlled vocabulary.

19. The system of claim 16, wherein the executable instructions that cause the processor to evaluate the electronic text document for the one or more multi-word expressions comprises executable instructions that cause the processor to scan the electronic text document from a beginning of the electronic text document to an end of the electronic text document in a reading direction.

20. The system of claim 16, wherein the executable instructions further cause the processor to:

when a second multi-word expression is found in the electronic text document, store a second abbreviation of the second multi-word expression;

evaluate the electronic text document for occurrences of the second abbreviation after a location of the second multi-word expression; and when an occurrence of the second abbreviation is found following the second multi-word expression, annotate the occurrence of the second abbreviation with the second multi-word expression.

* * * * *